Dec. 24, 1957     A. C. THOMAS     2,817,180
HOLLOW FISHING LURES
Filed Aug. 30, 1954     2 Sheets-Sheet 1
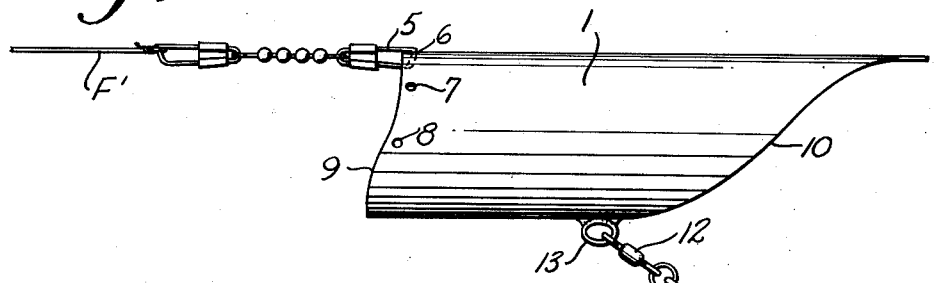
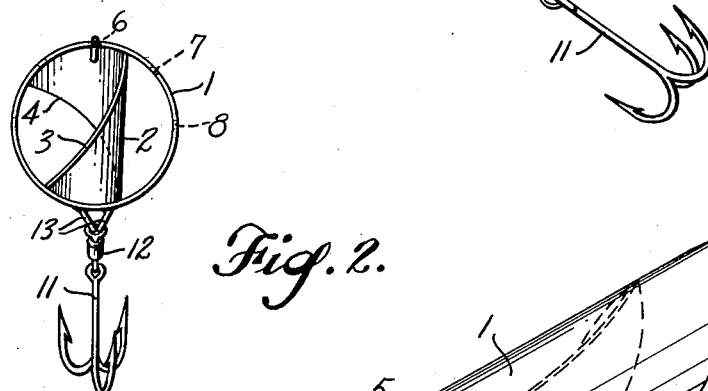
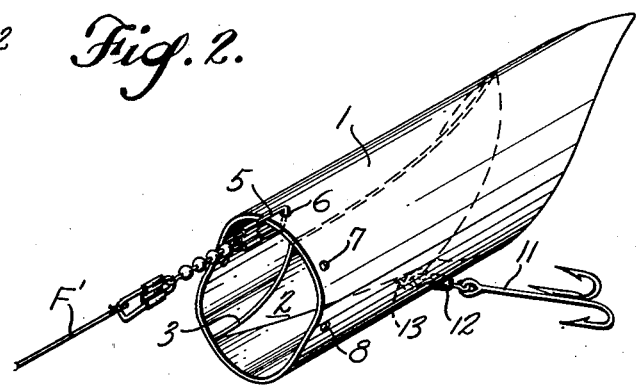
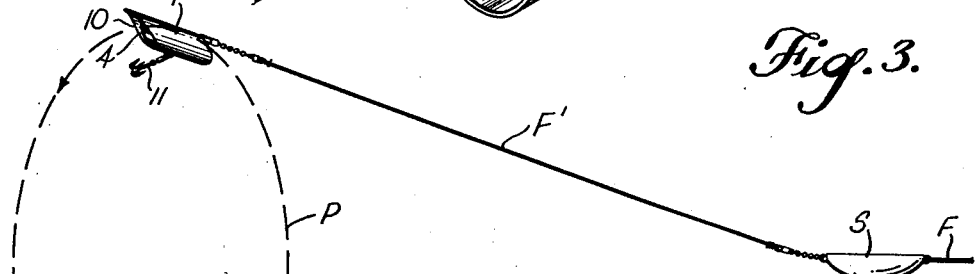
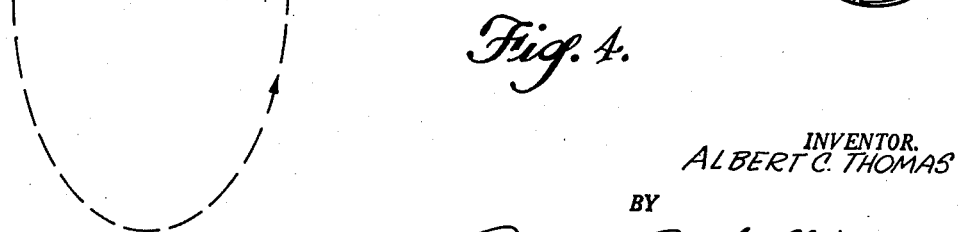
INVENTOR.
ALBERT C. THOMAS
BY
ATTORNEYS Dec. 24, 1957  A. C. THOMAS  2,817,180
HOLLOW FISHING LURES
Filed Aug. 30, 1954  2 Sheets-Sheet 2
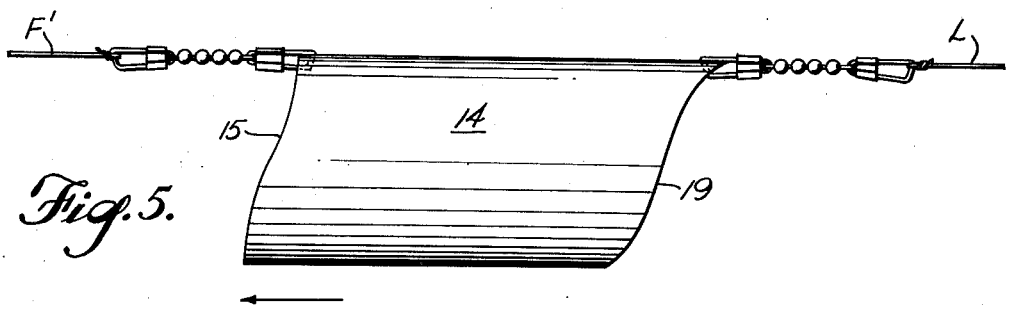
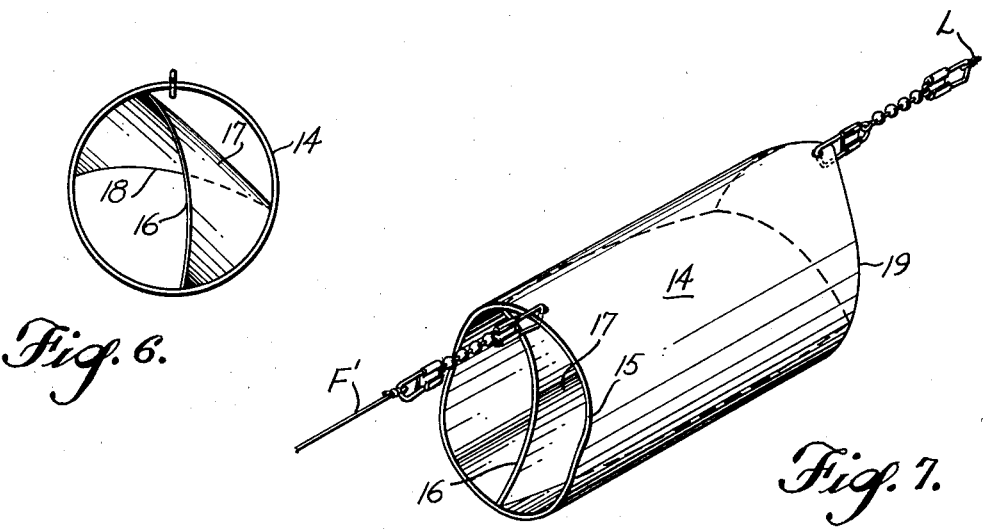
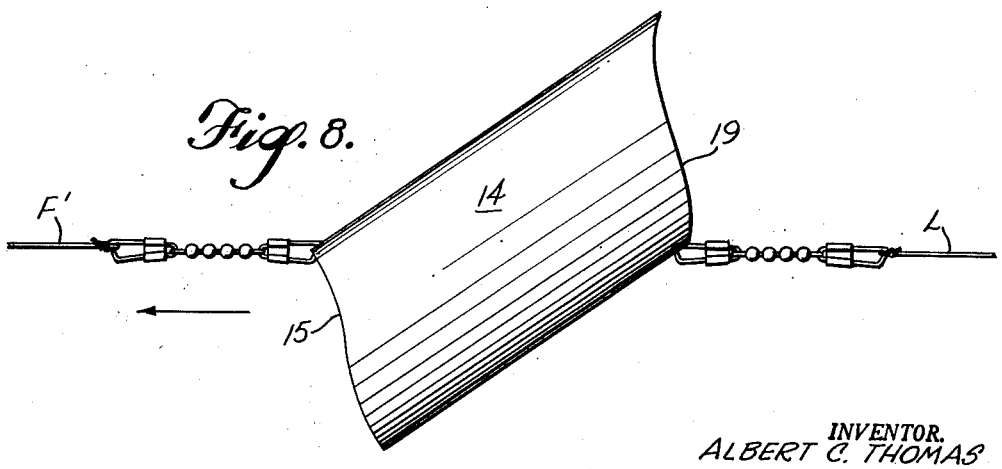
INVENTOR.
ALBERT C. THOMAS
BY
Reynolds, Beach & Christensen
ATTORNEYS United States Patent Office 2,817,180
Patented Dec. 24, 1957

2,817,180

HOLLOW FISHING LURES

Albert C. Thomas, Seattle, Wash.

Application August 30, 1954, Serial No. 452,960

15 Claims. (Cl. 43—42.06)

The present invention relates to fishing lures and particularly to such lures of hollow character which may be used either as a direct support for a fish hook or may have a fish hook line or leader attached to the lure.

In the past lures of various types have been proposed which have been shaped or colored to resemble fish, and which further have been shaped to move in zigzag paths or otherwise to move erratically for the purpose of attracting fish. All such prior lures, however, have had relatively little movement departing from a straight line, and for the most part the degree and type of such movement has been unpredictable. I have found that fish are attracted to a lure if it has a substantial lateral movement as well as a movement in the direction in which the fishing line is pulled.

The principal object of the present invention, therefore, is to provide a lure of a type which, when pulled through the water, will execute a movement of generally predetermined character of substantial degree laterally of the direction of pull of the fishing line. More specifically, it is an object to provide a lure which will move generally about an orbit as the fishing line to which it is attached is pulled through the water, so that the lure follows a generally spiral path through the water.

A further object is to form the lure or connect it to a fishing line so that it will not move smoothly in a spiral path, but will move more or less erratically to increase the attraction of fish.

Another object is to provide a lure which can be altered somewhat in shape, size or design to change the diameter of the orbit in which the lure moves and to increase or decrease the amount of erratic movement of the lure or the speed with which it changes course in such erratic movements to render the movement of the lure more or less lively.

An object is to provide a lure having the attributes discussed above, which can be constructed easily of inexpensive materials and can be made available in a wide variety of sizes and shapes. Moreover, a particular lure body can be interposed between a fishing line and a hook leader, or a hook can be attached directly or coupled closely to the lure, as may be preferred.

The spiral path of the lure of this invention is produced by orbital rotation of the lure about the line of movement of the fishing line as established by a sinker. The portion of the line connecting the sinker and the lure thus traces a conically spiral path as the lure revolves. The lure may be composed of a tubular sheet metal body preferably of cylindrical shape and having generally inclined leading and trailing ends. Through the hollow of the body extends a strip partition twisted preferably through an angle of approximately ninety degrees, which divides the body into two passages. Preferably also the partition is formed of sheet metal and curved transversely so as to form one passage of crescent-shaped cross section, and the other passage of generally lenticular cross section.

While a lure having the general characteristics and features mentioned above can be varied considerably in accordance with my invention, two preferred embodiments are shown in the accompanying drawings and described in detail hereafter.

Figure 1 is a side elevation view of a hollow fish lure to which a fish hook is attached in close coupled relationship, and Figure 2 is an end elevation view of such lure as seen from the leading end.

Figure 3 is a front top perspective view of the lure shown in Figures 1 and 2, and Figure 4 is a rear bottom perspective view of the lure and a portion of the fishing line illustrating generally a typical orbital movement of the lure about a sinker.

Figure 5 is a side elevation view of a lure to which a fishing line and fish hook leader are attached in alignment, and Figure 6 is an end elevation view of such lure as viewed from the leading end.

Figure 7 is a front top perspective view of the lure shown in Figures 5 and 6.

Figure 8 is a side elevation view of the lure shown in Figures 5, 6 and 7, but illustrating the lure in cocked position effected by attachment of the fishing line and fish hook leader to opposite sides of the lure body as shown.

The lure shown in Figures 1, 2, 3 and 4 has its tubular body 1 formed of uniform thickness sheet material which preferably is sheet metal, although it may be of plastic. The body is shown as being of cylindrical shape, and if made of plastic could be of seamless material. Alternatively, whether made of sheet metal or of plastic, the body can be formed of a flat sheet of material curled and having its edges joined by any type of adhesion. Sheet metal edges, for example, could be joined by spotwelding or soldering. Whether of plastic or sheet metal, it is desirable that the body be of bright material so that the flashing produced by the body during movement of the lure will attract fish.

In order to make the lure further attractive to fish it is constructed to move a substantial distance laterally from the path of movement of a fishing line F shown in Figure 4, to which it is attached. Preferably the general path of movement of the lure is of spiral shape, which movement is accomplished by orbital revolution of the lure generally in the path P indicated in broken lines in Figure 4. As the lure traverses such a path while it is pulled through the water, the portion of the fishing line F' which connects the lure to a sinker S will trace a conical envelope having its apex substantially at the sinker, ignoring the forward movement of the fishing line.

The lure is induced to move in this fashion by providing a partition extending lengthwise through the hollow of the body 1 which is of spiral shape. The partition 2 illustrated in the drawings preferably is made as a strip of sheet material, which again may be either of plastic or of sheet metal as may be preferred. The edges of such partition are joined to the inner surface of the body and should extend generally diametrically across the body to form passages of approximately equal cross section. It is essential that the partition be twisted lengthwise of the lure body and the degree of twist may be approximately ninety degrees, so that as shown in Figure 2, the leading edge 3 and the trailing edge 4 of the partition cross approximately perpendicularly. It is further preferred that the partition be curved transversely somewhat so that the passage at one side of the partition is of crescent-shaped cross section, and the passage at the other side of the partition is of generally lenticular cross section.

The portion F' of the fishing line is attached to the margin of the leading end of the body so that the pull of the fishing line is exerted eccentrically of the axis of the body. A wire fastener 5, for example, may be secured in a hole 6, 7 or 8. The leading end 9 of the body may be generally inclined, and the hole 6 is shown at the most rearward portion of the incline, while the holes 7 and 8 are spaced circumferentially around the leading edge toward its most forward portion. The designation of the leading edge as generally inclined is intended to include a profile of generally ogee shape as shown in Figure 1.

The trailing end of the body 10 is also shown as inclined, and such inclination is greater in degree than the inclination of the leading end. Also, the inclinations of the opposite ends of the body 1 are such that the most rearward portion of the leading end 9 is in longitudinal alignment with the farthest aft portion of the trailing end 10. Correspondingly, the most forward portion of the leading end 9 is in longitudinal alignment with the farthest forward portion of the trailing end 10. It is preferred that the line F' be attached to a location of the leading end remote from its farthest forward portion, and the hook 11, if close-coupled to the body as shown in Figures 1 and 3, such as being secured by a swivel connector 12, should be attached to a location on the body, such as by the eye 13, at a location adjacent to the farthest forward portion of the trailing end 10.

When the fishing line F, F' is attached to a lure of the type described and the line is drawn through the water, the lure will describe generally a helical path of a diameter corresponding to the diameter of the circle P shown in Figure 4, for example. The size of the circle or spiral may be reduced by using a smaller lure, or by shortening the line F', or by placing the point of connection of the line closer to the most forward projecting portion of the leading end of the body. The diameter of the spiral path followed by the lure can, of course, be enlarged by modifying the lure in the opposite respects.

Also, it has been found that the smaller the lure, the faster will be its revolution, and the speed of revolution also can be increased by tapering the body rearwardly or by applying the tractive force to the lure at a location on the leading end of the body which the concave side of the partition faces, whereas the movement will be slower if the point of attachment is on the side of the body which the convex side of the partition faces.

It has been found that the leading end of the partition 2 preferably should be generally parallel to a line joining the most forward and the most rearward portions of the inclined leading edge 9 of the body 1 for best results. The direction of rotation of the lure will be transversely of the body in the direction toward which the partition 2 is curved. Thus in Figure 4 the direction of rotation is indicated by arrows in the circle P. The more convex the partition is, the faster the lure will rotate for a given speed of tow through the water.

Also, the relationship of the width to length of the lure affects its action. For practical purposes the lure can be from one and one-half to four times as long as it is wide. The longer a particular lure is in proportion to its width, the slower will be its movement and the less erratic such movement will be. As an example, a body 1 one-half inch in diameter could be from three-quarters of an inch long to two inches long, and a lure one and one-half inches in diameter could be from about two and one-quarter inches to six inches in length. Also, the length of fishing line between the lure and the sinker S should be shorter for smaller lures and will be within the range of from two to six feet in length.

The degree of inclination of the body ends can vary. The leading end 9 could be straight or inclined to an angle of about thirty degrees to a radial plane. The trailing end, on the other hand, should be inclined from about thirty degrees to a radial plane to about sixty degrees to a radial plane.

When a more erratic action of the lure is desired, the inclination of the leading end can be increased, or the degree of curvature of the partition 2 can be decreased, or both.

The amount of twist of the partition 2 also affects the action of the lure. When the twist from front to rear as viewed from the front is in a counterclockwise direction the revolution of the lure will be clockwise, as viewed from the front. The greater the degree of twist beyond a twist of ninety degrees within limits, the smaller will be the circle followed by the lure, and the faster will be its rotative movement. Conversely, the smaller the angle of twist, or the shorter the partition, the larger will be the circle or spiral through which the lure moves, and the slower will be its revolution.

While the lure will generally follow a circle to traverse a helical path, it will dart first in one direction and then another as it moves generally along such a path.

As has been mentioned, the lure need not have the fish hook coupled closely to it. In Figures 5 to 8 the body 14 may be made of sheet plastic or metal like the lure body previously described. Ordinarily it will be desirable for the lure to be made somewhat larger where the fish hook is connected to it, such as by a leader L. The fishing line F' may be connected generally to the same location on the leading edge 15, as previously described, which leading edge may be inclined or of ogee contour as also described. The leading edge 16 of the partition 17 is shown as being somewhat more nearly parallel to a line joining the most forward portion and the most rearward portion of the leading end 15. The trailing end 18 of the partition, however, still crosses the leading end of the partition approximately perpendicularly as shown in Figure 6.

The trailing end 19 of the lure 14 is shown as being inclined to a lesser degree than the trailing end 10 illustrated in Figure 1. Generally, however, it may be said that the structure of the lure shown in Figures 5 to 7 is comparable to the structure of the lure shown in Figures 1 to 4 and will perform in much the same way.

In Figure 5 the fish hook leader L is connected to the rearmost portion of the trailing edge 19, whereas in Figure 8 the leader is shown as being connected to the forwardmost portion of the trailing end. The effect of such latter connection, as illustrated in Figure 8, is that the lure will be tilted lengthwise by the force of drawing it through the water. Such connection of the fishing line and leader also produces a faster rotation and more erratic movement than when the fishing line and leader are connected as shown in Figure 5.

Whether the lure is used with a hook close-coupled to the body as shown in Figures 1 to 3, or carried at the end of a leader L, shown in Figures 5 to 8, the body will serve both to revolve the hook and move it erratically, as well as to attract the fish by virtue of its movement. Such a lure can be used effectively either for casting or for trolling and is suitable for bass, trout or salmon fishing.

I claim as my invention:

1. A fishing lure adapted for attachment to a fishing line and comprising a hollow tubular body open at both ends for flow of water therethrough and incorporating a peripheral wall of sheet material having an inclined leading end, tow line attaching means on said peripheral wall approximately at the farthest rearward portion of the leading end of said peripheral wall, and a longitudinally twisted partition of sheet material extending through said body and dividing said hollow of the body into two longitudinal passages.

2. A fishing lure adapted for attachment to a fishing line and comprising a tubular body open at both ends for flow of water therethrough and incorporating a peripheral wall of sheet material having a leading end and having a plurality of holes in the leading end of said peripheral wall spaced circumferentially of such leading end and disposed adjacent to the most rearward portion of the leading end, said holes rendering said leading end selectively engageable by a fishing tow line, and a longitudinally twisted partition extending longitudinally within the hollow of said body.

3. A fishing lure adapted for attachment to a fishing line and comprising a tubular body open at both ends for flow of water therethrough and incorporating a peripheral wall of sheet material, a partition of sheet material extending through the hollow of said body, twisted throughout its length approximately one-quarter of a turn and dividing the body hollow into two longitudinal passages, and fishing tow line attaching means on one side of the leading end of said peripheral wall.

4. A fishing lure adapted for attachment to a fishing line and comprising a tubular body of sheet material open at both ends for flow of water therethrough, having a substantially cylindrical shape and having leading and trailing ends, both of said ends being inclined relative to the longitudinal axis of said body, the trailing end being inclined to a greater degree than the leading end, and a partition extending lengthwise through said body, twisted throughout its length approximately one-quarter of a turn and dividing the hollow of said body into two longitudinal passages.

5. A fishing lure adapted for attachment to a fishing line and comprising a tubular body open at both ends for flow of water therethrough and having a leading end and a trailing end, both of said ends being inclined relative to the longitudinal axis of said body substantially from the same side of said body toward the opposite side of said body, and a longitudinally twisted partition extending through said body, dividing the hollow of said body into two longitudinal passages, and fixed to said body so that one end bridges between substantially said same side of said body and said opposite side of said body.

6. A fishing lure adapted for attachment to a fishing line and comprising a tubular body of sheet material open at both ends for flow of water therethrough and having a leading end and a trailing end, both of said ends being inclined relative to the longitudinal axis of said body substantially from the same side of said body toward the opposite side of said body, said ends being inclined in corresponding directions from said same side of said body, the trailing end being inclined more than the leading end, and a longitudinally twisted partition of sheet material extending through said body and dividing the hollow of said body into two longitudinal passages.

7. A fishing lure adapted for attachment to a fishing line and comprising a tubular body open at both ends for flow of water therethrough and incorporating a peripheral wall of sheet material, tow line attaching means on one side of the leading end of said sheet material peripheral wall, and a partition having a portion longitudinally twisted a substantial amount extending lengthwise within said body and dividing the hollow of said body into two longitudinal passages.

8. A fishing lure adapted for attachment to a fishing line and comprising a tubular body of sheet material open at both ends for flow of water therethrough and having a substantially cylindrical shape and a trailing end inclined relative to the longitudinal axis of said body, and a partition extending lengthwise within the hollow of said body, said partition being twisted lengthwise a substantial amount within said body and dividing the hollow of said body into two longitudinal passages.

9. A fishing lure adapted for attachment to a fishing line and comprising a tubular body of sheet material open at both ends for flow of water therethrough and having a substantially cylindrical shape and a leading end and a trailing end, both of said ends being inclined relative to the longitudinal axis of said body, and a partition extending lengthwise within the hollow of said body, said partition being twisted lengthwise a substantial amount within said body and dividing the hollow of said body into two longitudinal passages.

10. A fishing lure adapted for attachment to a fishing line and comprising a tubular body of sheet material open at both ends for flow of water therethrough, having a substantially cylindrical shape and incorporating an annular wall having leading and trailing ends, both of said ends being inclined relative to the longitudinal axis of said body but the trailing end being inclined to a greater degree than the leading end, a partition extending lengthwise within the hollow of said body, said partition being twisted lengthwise a substantial amount within said body and dividing the hollow of said body into two longitudinal passages, and fishing tow line attaching means on one side of the leading end of said annular wall.

11. A fishing lure adapted for attachment to a fishing line and comprising a tubular body of sheet material open at both ends for flow of water therethrough having a substantially cylindrical shape and having leading and trailing ends, both of said ends being inclined relative to the longitudinal axis of said body but the trailing end being inclined to a greater degree than the leading end, and a partition extending lengthwise within said body, said partition being twisted lengthwise a substantial amount within said body and throughout its length being curved transversely of its length, dividing the hollow of said body into two longitudinal passages, one passage being of crescent shape in cross section and the other passage being of generally lenticular shape in cross section.

12. A fishing lure adapted for attachment to a fishing line and comprising a tubular body member open at both ends for flow of water therethrough, a longitudinally twisted partition member in the hollow of said body member extending lengthwise thereof and thereby dividing the hollow of said body member into two longitudinal passages, the total twist of said partition over its length being approximately one-quarter of a turn, and fishing tow line attaching means secured directly to one of said members.

13. A fishing lure adapted for attachment to a fishing line and comprising a tubular body open at both ends for flow of water therethrough, and a partition extending lengthwise within said body, said partition being twisted lengthwise a substantial amount within said body and dividing the hollow of said body into two longitudinal passages, said partition being curved transversely of its length making one of its faces transversely concave throughout its length and the other of its faces transversely convex throughout its length.

14. A fishing lure adapted for attachment to a fishing line and comprising a tubular body open at both ends for flow of water therethrough, and a partition extending lengthwise within said body, said partition being twisted throughout its length within said body approximately one-quarter of a turn and dividing the hollow of said body into two longitudinal passages, said partition being curved transversely of its length making one of its faces transversely concave throughout its length and the other of its faces transversely convex throughout its length.

15. A fishing lure adapted for attachment to a fishing line and comprising a tubular body open at both ends for flow of water therethrough and having a hollow therethrough of substantially cylindrical shape, and a partition extending lengthwise within said body, being twisted lengthwise a substantial amount within said body and throughout its length being curved transversely of its length and dividing the hollow of said body into two longitudinal passages, one passage throughout its length being of crescent shape in cross section and the other passage throughout its length being of generally lenticular shape in cross section.

References Cited in the file of this patent

UNITED STATES PATENTS

| | | |
|---|---|---|
| 1,645,874 | Sanford | Oct. 18, 1927 |
| 1,708,825 | Barclay | Apr. 9, 1929 |
| 1,710,908 | Vereecken | Apr. 30, 1929 |

(Other references on following page)

UNITED STATES PATENTS

| | | |
|---|---|---|
| 2,008,437 | DeWitt | July 16, 1935 |
| 2,108,728 | Schilling | Feb. 15, 1938 |
| 2,167,335 | Hayes | July 25, 1939 |
| 2,229,239 | Davis | Jan. 21, 1941 |
| 2,229,369 | Buettner | Jan. 21, 1941 |
| 2,517,620 | Anderson | Aug. 8, 1950 |
| 2,736,124 | Wittmann | Feb. 28, 1956 |

FOREIGN PATENTS

| | | |
|---|---|---|
| 39,440 | Sweden | Mar. 20, 1914 |